(12) United States Patent
Kim et al.

(10) Patent No.: US 8,395,630 B2
(45) Date of Patent: Mar. 12, 2013

(54) FORMAT CONVERSION APPARATUS FROM BAND INTERLEAVE FORMAT TO BAND SEPARATE FORMAT

(75) Inventors: Jong Myon Kim, Yongin-si (KR); Jun Jin Kong, Yongin-si (KR); Jeongwook Kim, Seongnam-si (KR); Suk Jin Kim, Seoul (KR); Soojung Ryu, Cheonan-si (KR); Kyoung June Min, Yongin-si (KR); Dong-Hoon Yoo, Suwon-si (KR); Dong Kwan Suh, Uiwang-si (KR); Yeon Gon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1148 days.

(21) Appl. No.: 11/769,319

(22) Filed: Jun. 27, 2007

(65) Prior Publication Data

US 2008/0158238 A1 Jul. 3, 2008

(30) Foreign Application Priority Data

Jan. 2, 2007 (KR) .................. 10-2007-0000315
Feb. 26, 2007 (KR) .................. 10-2007-0018901

(51) Int. Cl.
 *G09G 5/39* (2006.01)
(52) U.S. Cl. ...................... 345/531; 345/572
(58) Field of Classification Search .......... 345/531, 345/572
See application file for complete search history.

(56) References Cited

U.S. PATENT DOCUMENTS

| 4,992,961 | A | * | 2/1991 | Petersen ................. 345/568 |
| 5,253,308 | A | | 10/1993 | Johnson |
| 5,384,582 | A | | 1/1995 | Keith et al. |
| 5,606,347 | A | * | 2/1997 | Simpson ................. 345/550 |
| 5,671,440 | A | | 9/1997 | Curry |
| 5,798,753 | A | | 8/1998 | Zhou et al. |
| 5,943,040 | A | * | 8/1999 | Rice ................. 345/600 |
| 5,953,021 | A | | 9/1999 | Cheng |
| 6,943,798 | B1 | | 9/2005 | Olano et al. |
| 2005/0213842 | A1 | | 9/2005 | Aldrich et al. |

FOREIGN PATENT DOCUMENTS

| EP | 0549316 A2 | 12/1992 |
| JP | 10117318 A | 5/1998 |
| JP | 11-122495 A | 4/1999 |
| JP | 2000-069478 A | 3/2000 |
| JP | 2003-110853 A | 4/2003 |
| JP | 2006-191362 A | 7/2006 |
| WO | 98/32090 A2 | 7/1998 |

OTHER PUBLICATIONS

Kornfeld, C: "Fast Methods for Orthogonally Reorienting Bitmap Images" Proceedings of the SID, Society of Information Display. Playa del Rey, CA, US, vol. 28, No. 4, Jan. 4, 1987, pp. 431-438.

* cited by examiner

*Primary Examiner* — Maurice L McDowell, Jr.
(74) *Attorney, Agent, or Firm* — Sughrue Mion, PLLC (57) ABSTRACT

A format conversion apparatus which converts image data of a band interleave format into image data of a band separate format is provided. The apparatus includes a memory which stores image data of a band interleave format; and a converting module which reads the memory by increasing a read address of the memory for each stride, and converts the image data of the band interleave format into image data of a band separate format.

20 Claims, 10 Drawing Sheets

FIG. 1 (RELATED ART)

| R0 | G0 | B0 | R1 | G1 | B1 | R2 | G2 | B2 | R3 | G3 | B3 | R4 | G4 | B4 | R5 |
|---|---|---|---|---|---|---|---|---|---|---|---|---|---|---|---|
| G5 | B5 | R6 | G6 | B6 | R7 | G7 | R8 | G8 | B8 | R9 | G9 | B9 | R10 | G10 |
| B10 | R11 | G11 | B11 | R12 | G12 | B12 | R13 | G13 | B13 | G14 | R14 | B14 | R15 | G15 | B15 |
| R16 | G16 | B16 | R17 | G17 | B17 | R18 | G18 | B18 | R19 | G19 | B19 | R20 | G20 | B20 | R21 |

←— 128-BIT —→

| R1 | B0 | G0 | R0 |
|---|---|---|---|
| ~513 | ~515 | ~517 | ~519 |

| 531 (R1) | 532 | 533 | 534 (R0) |
|---|---|---|---|
| 535 | 536 | 537 (G0) | 538 |
| 539 | 541 (B0) | 542 | 543 |

FIG. 6B

| | G2 | R2 | B1 | G1 |
|---|---|---|---|---|
| | ~513 | ~515 | ~517 | ~519 |

| 531 (R1) | 532 (R2) | 533 | 534 (R0) |
|---|---|---|---|
| 535 (G2) | 536 | 537 (G0) | 538 (G1) |
| 539 | 541 (B0) | 542 (B1) | 543 |

FIG. 6C

| B3 | G3 | R3 | B2 |
|---|---|---|---|
| ~513 | ~515 | ~517 | ~519 |

| 531 (R1) | 532 (R2) | 533 (R3) | 534 (R0) |
|---|---|---|---|
| 535 (G2) | 536 (G3) | 537 (G0) | 538 (G1) |
| 539 (B3) | 541 (B0) | 542 (B1) | 543 (B2) |

FORMAT CONVERSION APPARATUS FROM BAND INTERLEAVE FORMAT TO BAND SEPARATE FORMAT

CROSS-REFERENCE TO RELATED APPLICATIONS

This application claims priority from Korean Patent Application No. 10-2007-0000315, filed on Jan. 2, 2007 in the Korean Intellectual Property Office, and Korean Patent Application No. 10-2007-0018901, filed on Feb. 26, 2007 in the Korean Intellectual Property Office, the entire disclosure of both of which are incorporated herein by reference.

BACKGROUND OF THE INVENTION

1. Field of the Invention

Methods and apparatuses consistent with the present invention relate to an image process apparatus and method, and more particularly, to a format conversion apparatus and method which can convert image data of a band interleave format into image data of a band separate format.

2. Description of Related Art

Figure 1:
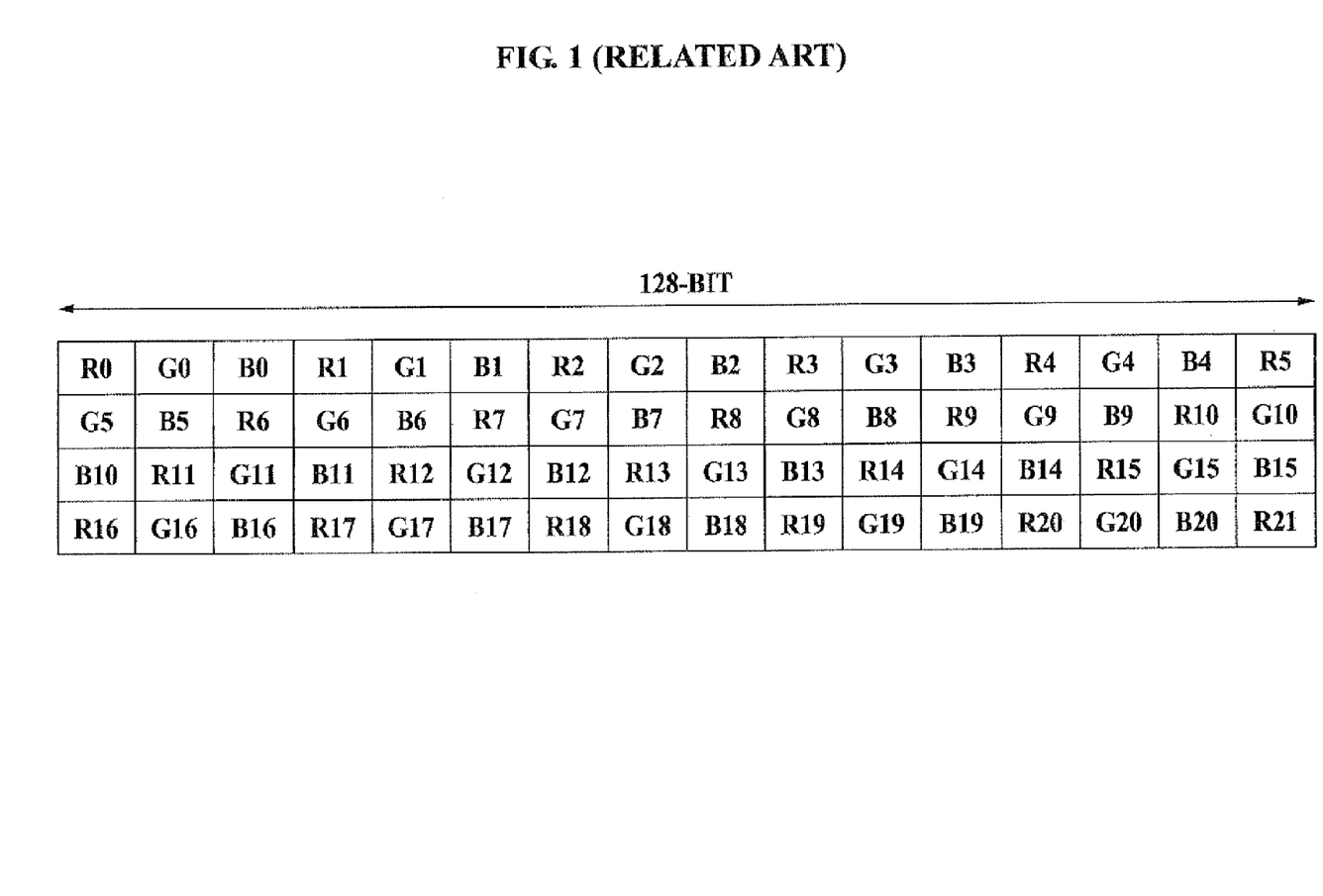
FIG. 1 is a diagram illustrating a band interleave format according to a related art.

FIG. 1 is a diagram illustrating image data stored in a band interleave format according to a related art. Digital image data created by a digital camera, a digital camcorder, and the like, is generally stored in an image buffer or a memory, in the band interleave format as illustrated in FIG. 1. Also, much image data stored in a personal computer (PC) are stored in the band interleave format. A color of one pixel may be shown as a combination of red (R), green (G), and blue (B). The color of one pixel in FIG. 1 is designated in a total of 24-bits, eight bits for each of R, G, and B. The band interleave format corresponds to a format in which color bands are mixed. Data respectively showing R, G, and B are not collected, and color bands are mixed in RGBRGB and the like, in the band interleave format of FIG. 1. Conversely, a format in which data are separated depending on the color band is referred to as a "band separate format". For example, each of N-number of data of an identical color band may be collected. Also, Rs are separately collected, Gs are separately collected, and Bs are separately collected. In this case, the data are stored in forms such as RR . . . RGG . . . GBB . . . B, and the like. In this instance, when each of four data of an identical color band are collected, it is shown as RRRRGGGGBBBBRRRRGGGG-BBBB, and the like. RGB data and image data having a different form such as a YCbCr form may similarly include the band interleave format and the band separate format.

There are significantly many calculations of identical color band data among different pixels, or many calculations of identical color band data among corresponding pixels in different image frames when processing the image data. Accordingly, the band separate format has even greater efficiency of calculations than the band interleave format when processing the image data.

Accordingly, a format conversion apparatus and method which can convert image data of a band interleave format into image data of a band separate format, is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention is to provide a display apparatus having a communication function which controls the operation of a communication module conducting communication with an external network such that the communication module is rebooted according to operational status, and a control method thereof.

An aspect of the present invention provides a format conversion apparatus and method which can efficiently convert image data of a band interleave format into image data of a band separate format.

Another aspect of the present invention provides a format conversion apparatus and method which can convert image data of a band interleave format into image data of a band separate format, subsequently partition an arithmetic logic unit (ALU) into N-partitions, and process the image data of the band separate format by a single instruction multiple data (SIMD) method, thereby improving efficiency of an image process.

According to an aspect of the present invention, there is provided a format conversion apparatus, the apparatus including a memory which stores image data of a band interleave format; and a converting module which reads the memory by increasing a read address of the memory for a stride, and converts the image data of the band interleave format into image data of a band separate format. The data, which is read by increasing the read address of the memory by the stride, corresponds to an image data component of an identical type.

According to another aspect of the present invention, there is provided a format conversion apparatus, the apparatus including a memory which stores image data of a band interleave format; a memory controller which, for each clock cycle, increases a read address of the memory from a base address for each stride, and applies the read address to the memory; and a register file which includes an N-number of registers, each of the N-number of registers storing each data of the N-number of data successively read by the applying of the read address. The data stored in the register file corresponds to a band separate format.

In an aspect of the present invention, the memory controller includes a latch which receives the base address, and stores the input base address. Also, the memory controller, for each clock, outputs a value of adding the base address, which is stored in the latch, and the stride to an address line of the memory, and stores the added value in the latch.

In another aspect of the present invention, the apparatus further includes a controller which performs a calculation by simultaneously inputting the data stored in the N-number of registers into an N-partitioned ALU.

According to still another aspect of the present invention, there is provided a format conversion apparatus, the apparatus including a memory which stores image data of a band interleave format; and a converting module which repeats an operation of reading, from the memory, a plurality of image data components, and storing the plurality of image data components in a predetermined register, and which converts the plurality of image data components into image data of a plurality of band separate formats.

In an aspect of the present invention, the converting module includes an address generation unit (AGU) which generates a read address reading the plurality of image data components from the memory, and applies the read address to the memory; a register file which includes a plurality of registers storing the plurality of image data components read by the applying of the read address; and an SIMD packer which enables a plurality of registers in a location predetermined depending on a type of the image data component from among the register files, and stores the plurality of image data components in the plurality of registers.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF THE EXEMPLARY EMBODIMENTS OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
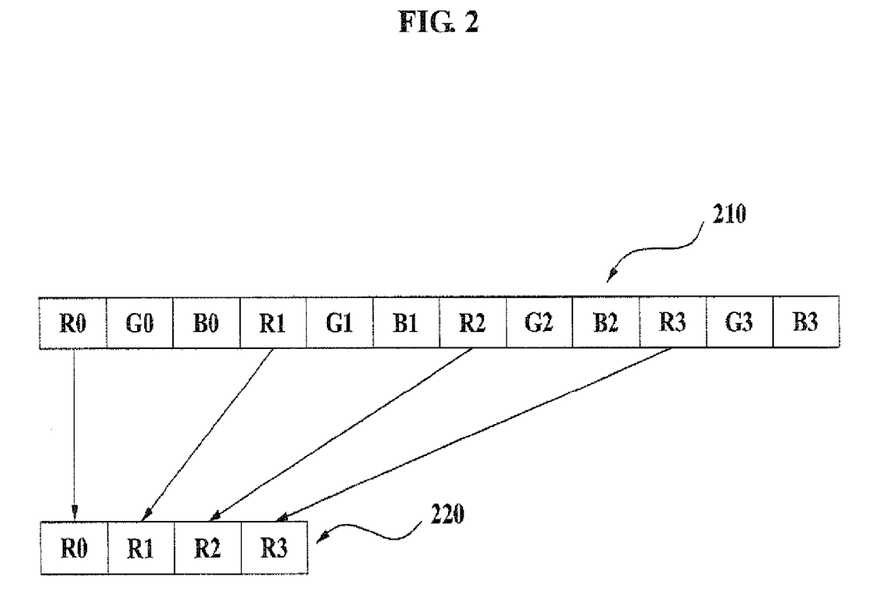
FIG. 2 is a diagram illustrating converting a band interleave format into a band separate format according to an exemplary embodiment of the present invention.

FIG. 2 is a diagram illustrating converting a band interleave format into a band separate format according to an exemplary embodiment of the present invention.

Image data 210 of FIG. 2 is stored in a band interleave format. Specifically, it is understood that each color band of red (R), green (G), and blue (B) is not collected, and is mixed, in the image data 210. Also, image data 220 is stored in a band separate format. In the image data 220, data are separated for each color band of R, G, and B. Specifically, k-number of R data, k-number of G data, and k-number of B data are collected. In order to convert the image data of the band interleave format 210 into the image data of the band separate format 220, only data of an identical color band are extracted from the image data of the band interleave format 210, and are stored being connected for each k-number of the data as illustrated in FIG. 2.

A format conversion apparatus according to an exemplary embodiment of the present invention is described in detail with reference to FIG. 3.

Figure 3:
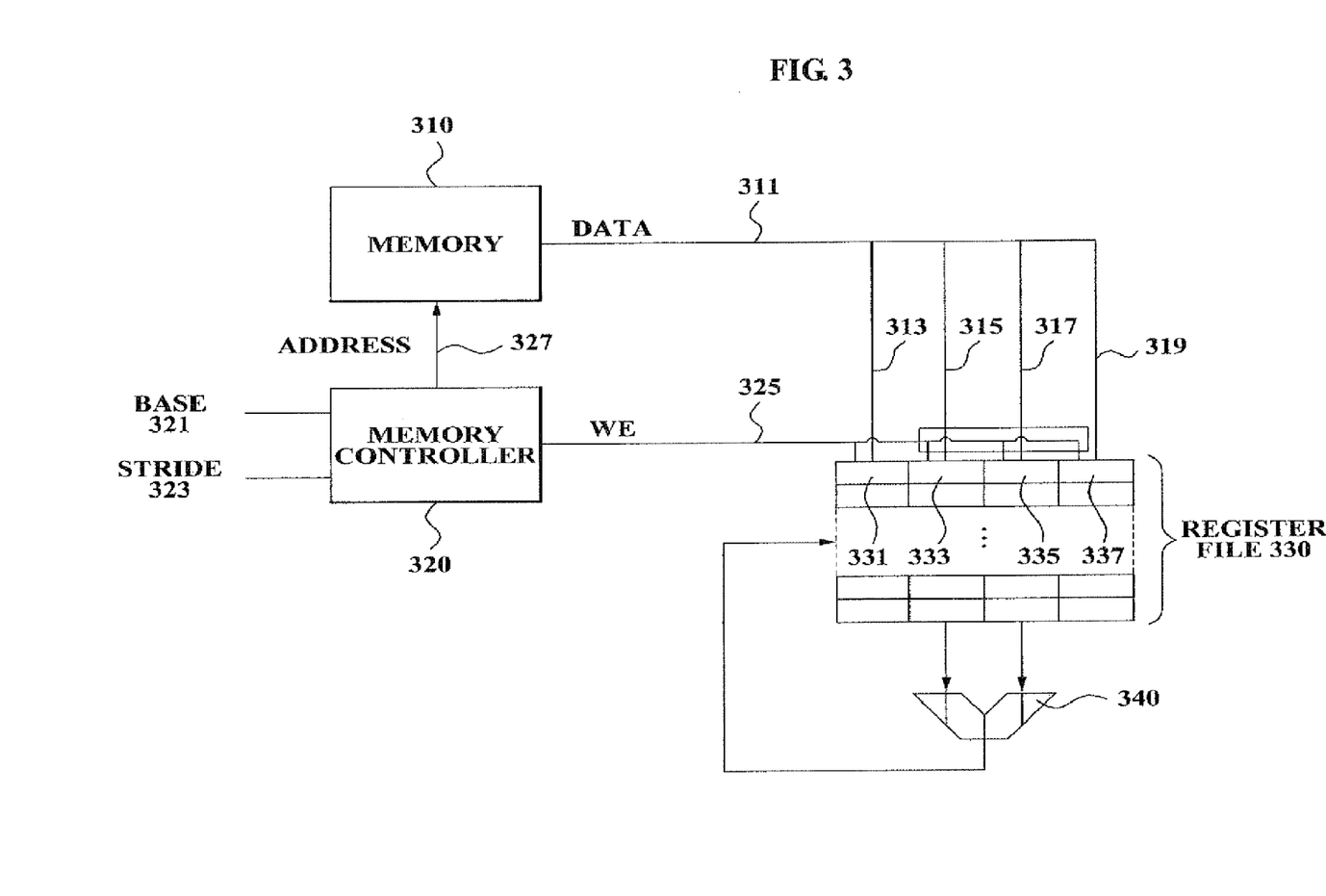
FIG. 3 is a diagram illustrating a format conversion apparatus according to an exemplary embodiment of the present invention.

As illustrated in FIG. 3, the format conversion apparatus according to the present exemplary embodiment includes a memory 310 which stores image data of a band interleave format, and a converting module which converts the image data of the band interleave format into image data of a band separate format.

The memory 310 stores the image data of the band interleave format. For example, when an exemplary embodiment of the present invention is applied to a digital camera, the digital camera stores, in the memory 310, the image data which is imaged, in the band interleave format. The band interleave format is described above in detail.

The converting module reads the memory 310 by increasing a read address of the memory 310 for each stride, and converts the image data of the band interleave format into the image data of the band separate format. The converting module includes a memory controller 320 and a register file 330.

The memory controller 320 includes an AGU which, for each clock cycle, increases the read address of the memory 310 from a base address for each stride, and applies the read address to the memory 310. Specifically, the memory controller 320 generates the base address, successively generates N-number of addresses by increasing the base address N-1 times for each stride, and applies the base address and the N-number of addresses to the memory 310.

For example, supposing that the image data 210 of FIG. 2 is stored in the memory 310, and each image data component has a 16-bit size. Accordingly, R0, G0, B0, R1, G1, B1, and the like, of FIG. 2 have the 16-bit size, respectively. Also, supposing that an address in which R0 is stored corresponds to "0". Accordingly, "0" corresponding to the base address is input into the memory controller 320 via a base line 321. Also, an image data component of an identical type subsequent to R0 corresponds to R1, and since an address of R1 corresponds to "48", "48" is input to a stride line 323.

In this case, the memory controller 320 generates N-number of addresses from the base address. The first address is the base address and the next N-1 number of addresses are generated by increasing the base address successively N-1 times for each stride. The generated N-number of addresses is applied to the memory 310. N corresponds to how many image data components of the identical type are grouped.

For example, when the present exemplary embodiment generates image data of a band separate format by collecting each of four image data components of an identical type, i.e., N=4, the base 321 input and the stride 323 input are performed, and subsequently, the base address input from the base 321 input is applied to the memory 310 via an address input line 327 of the memory 310, in a first clock cycle. Accordingly, 16-bit data of R0 corresponding to "0" being the base address is read, and is output to a data line 311 of the memory 310. The data line 311 is diverged into data lines 313, 315, 317, and 319, and is respectively connected with registers 331, 333, 335, and 337 of a register file 330. In this instance, the memory controller 320 selects and enables only the register 331 of the register file 330 via a write enable (WE) line 325. Accordingly, the 16-bit data of R0 via the data lines 313, 315, 317, and 319 is recorded in only the register 331.

Next, although there is no additional input at the base line 321 and the stride line 323, the memory controller 320 automatically applies, in a subsequent clock cycle, an address value "48" which increases the base address "0" up to "48" corresponding to a stride, to the memory 310 via the address input line 327, and enables only the register 333 via the WE line 325. Accordingly, 16-bit data of R1 read by the address "48" is output to the data line 311 of the memory 310. The data line 311 is diverged into the data lines 313, 315, 317, and 319, and is respectively connected with the registers 331, 333, 335, and 337 of the register file 330. In this instance, since only the register 333 of the register file 330 is enabled via the WE line 325, the 16-bit data of R1 is recorded in the register 333.

Next, the memory controller 320 applies, in a subsequent clock cycle, an address value "96" which increases the address value "48" up to "96" corresponding to the stride, to the memory 310 via the address input line 327, and enables only the register 335 via the WE line 325. Accordingly, 16-bit data of R2 read by the address "96" is recorded in the register 335.

Similarly, the memory controller 320 applies, in a subsequent clock cycle, an address value "144", which increases the address value "96" up to "144" corresponding to the stride, to the memory 310 via the address input line 327, and enables only the register 337 via the WE line 325. Accordingly, 16-bit data of R3 read by the address "144" is recorded in the register 337.

Accordingly, data R0, R2, R2, and R3 stored in the band interleave format of FIG. 2 are stored, in the registers 331, 333, 335, and 337, in the band separate format as illustrated in the image data of the band separate format 220 of FIG. 2. As described above, the data, which is read by increasing the read address of the memory 310 for the each stride, corresponds to an image data component of an identical type. Specifically, when an image data component "R" is read from the memory 310, the data, which is read from the memory 310 by increasing the stride, corresponds to an image data component of an identical type, specifically "R". When an image data component "G" is read from the memory 310, the data, which is read from the memory 310 by increasing the stride, corresponds to an image data component of an identical type, specifically "G".

Subsequently, when the input at the base line 321 corresponds to "16", and the input at the stride line 323 corresponds to "48", G0, G1, G2, and G3 are grouped, and when the base 321 input corresponds to "32", and the stride 323 input corresponds to "48", B0, B1, B2, and B3 are grouped.

The register file 330 includes a plurality of registers. When the register file 330 includes N-number of registers, each of the N-number of registers of the register file 330 stores each data read from the memory 310. The data stored in the register file 330 corresponds to the image data of the band separate format.

In the present exemplary embodiment, the memory controller 320 automatically generates N-number of addresses, and applies the N-number of addresses to the memory 310 although inputs to the base line 321 and the stride line 323 are performed once, however, the present invention is not limited thereto.

According to another exemplary embodiment of the present invention, only an interval of image data components to be grouped may be input by the stride 323 input. Specifically, "0" corresponding to the base address is input at the base line 321, and "3" is input at the stride line 323, in the above-described example. In the present exemplary embodiment, the memory controller 320 may generate a subsequent address, based on the input at the stride line 323 according to a predetermined rule. For example, the memory controller 320 calculates an actual stride required for generating the address by multiplying the stride 323 input by "16" corresponding to a size of one image data component, in the present exemplary embodiment. Accordingly, when "3" is input at the stride line 323, the actual stride is generated by multiplying the input at the stride line 323, "3", by a predetermined value "16". When "3" is input at the stride line 323, the memory controller 320 outputs an address "0" to the address line 327 in a first clock cycle, and outputs an address "48" to the address line 327 in a subsequent clock cycle. The address "48" corresponds to a value of adding the input to the stride line 323 to the calculated actual stride.

A controller (not illustrated) performs a calculation by simultaneously inputting the data stored in the N-number of registers 331, 333, 335, and 337 into an N-partitioned ALU 340. For example, the ALU 340 corresponds to an ALU which performs a 64-bit calculation, and when a 16-bit calculation is performed, one clock cycle should be consumed. When performing the calculation by simultaneously inputting four-numbers of 16-bit data into the ALU 340, fourfold throughput is provided. In FIG. 3, the 64-bit ALU 340 is used as a four-partitioned ALU, and performs the calculation by receiving four 16-bit register values as an input. This is described in detail later with reference to FIG. 7.

Figure 4:
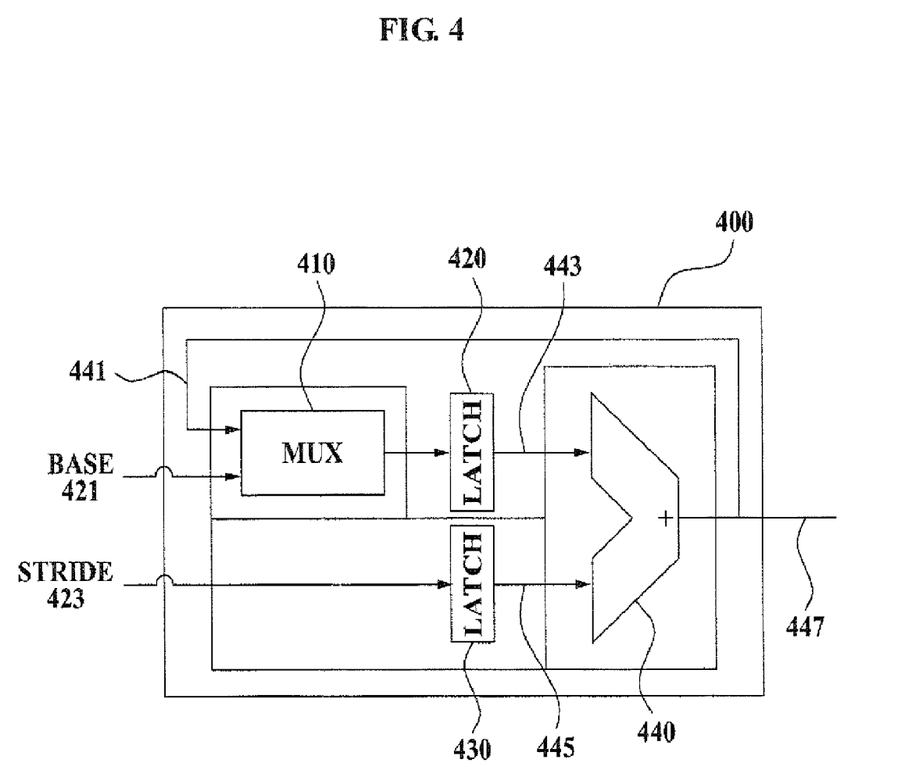
FIG. 4 is a diagram illustrating an AGU according to an exemplary embodiment of the present invention.

FIG. 4 is a diagram illustrating an AGU included in a memory controller according to an exemplary embodiment of the present invention. The AGU 400 includes a multiplexer (MUX) 410, latches 420 and 430, and an ALU 440.

The stride input at a stride line 423 is stored in the latch 430. When a value input at the stride line 423 is not directly used for a stride, and a value calculated for the stride input 423 is used for the stride, a module, which calculates the stride which is actually to be used in the stride line 423, is disposed between the stride line 423 and the latch 430.

A base line 421 and a fed-back output line 441 of the ALU are input into the MUX 410. The MUX 410 selects the base line 421 when generating the first address of N-number of addresses, selects the fed-back output line 441 of the ALU when generating the other addresses of N-number of addresses. The selected line by the MUX 410 is output to the latch 420.

For example, supposing that the image data 210 of FIG. 2 is stored in the memory 310, and each image data component has a 16-bit size. Accordingly, R0, G0, B0, R1, G1, B1, and the like, of FIG. 2 have the 16-bit size, respectively. Also, supposing that an address in which R0 is stored corresponds to "0". Accordingly, "0" corresponding to the base address is input into the AGU 400 via the base line 421. Also, an image data component of an identical type subsequent to R0 corresponds to R1, and since an address of R1 corresponds to "48", "48" is input at the stride line 423.

When the present exemplary embodiment generates image data of a band separate format by collecting each of four image data components of an identical type, i.e., N=4, the base 421 input and the stride 423 input are performed, and subsequently, the MUX 410 selects the base line 421 and outputs the base line 421 to the latch 420, and the value input by the base line 421 is stored in the latch 420, in a first clock cycle. As described above, the base address input at the base line 421 is input into the latch 420 via the MUX 410, and the input base address is stored in the latch 420. Also, the input at the stride line 423 is stored in the latch 430. Also, the value stored in the latch 420 is directly output to an address 447 of the memory 310.

In a next clock cycle, a base value "0" stored in the latch 420, and a stride "48" stored in the latch 430 are input by inputs of the ALU 443 and 445. The ALU 440 adds the input value, generates a subsequent address "48", and outputs the subsequent address "48" to the address 447 of the memory 310, and the fed-back output line 441. The output line 441 is selected by the MUX 410, and "48" is stored in the latch 420.

In a next clock cycle, a base value "48" stored in the latch 420, and the stride "48" stored in the latch 430 are input by the inputs of the ALU 443 and 445. The ALU 440 adds the input value, generates a subsequent address "96", and outputs the subsequent address "96" to the address 447 of the memory 310, and the fed-back output line 441. The fed-back output line 441 is selected by the MUX 410, and "96" is stored in the latch 420.

In a next clock cycle, a base value "96" stored in the latch 420, and the stride "48" stored in the latch 430 are input by the inputs 443 and 445 of the ALU 440. The ALU 440 adds the input value, generates a subsequent address "144", and outputs the subsequent address "144" to the address 447 of the memory 310, and the fed-back output line 441. The fed-back output line 441 is selected by the MUX 410, and "144" is stored in the latch 420. When N corresponds to four, i.e., N=4, and four addresses are entirely generated and output, a new value is input at the base line 421 and the stride line 423, in the AGU 400, and the AGU 400 repeats a procedure of generating four addresses again.

Figure 5:
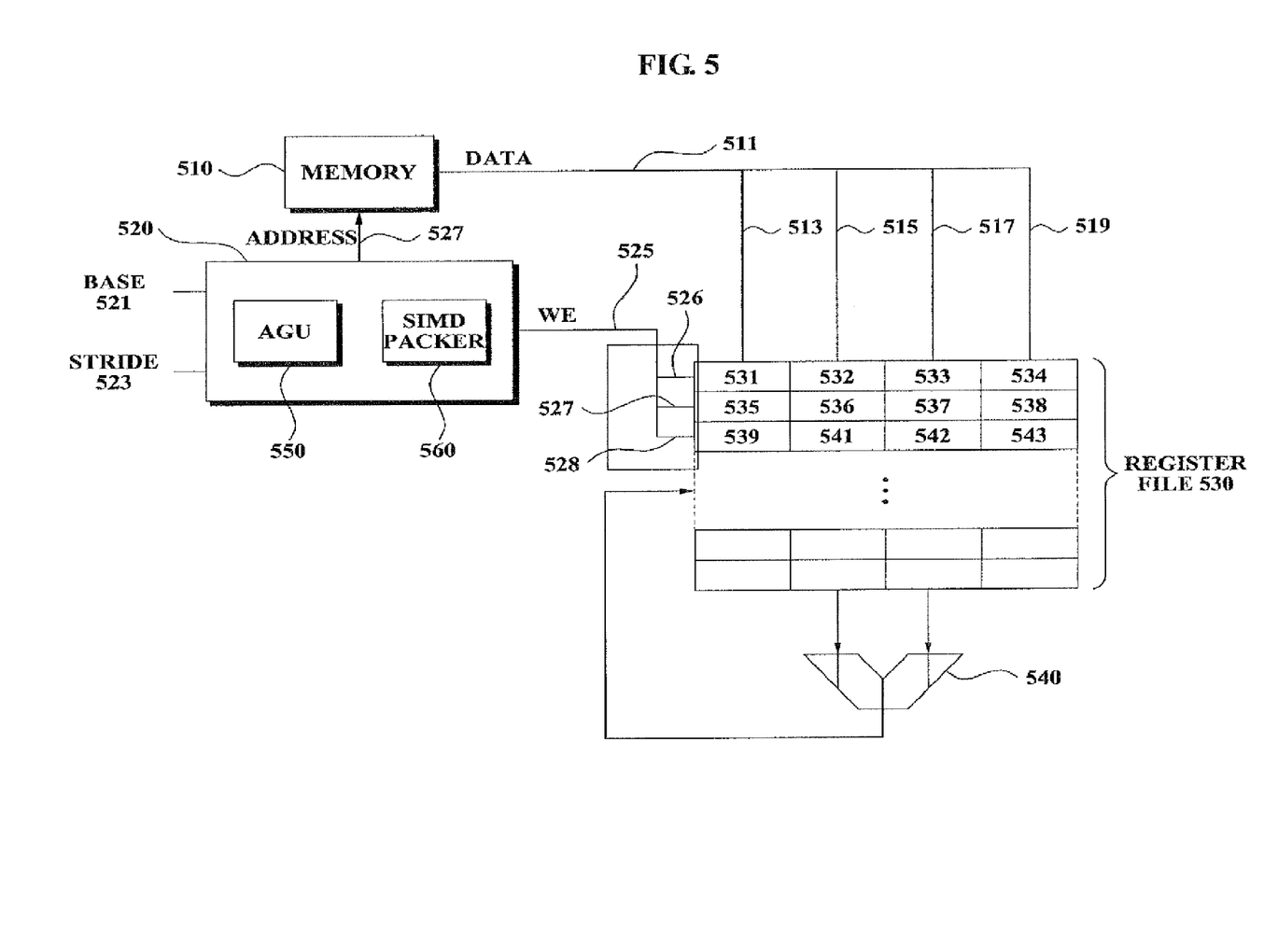
FIG. 5 is a diagram illustrating a format conversion apparatus according to another exemplary embodiment of the present invention.

FIG. 5 is a diagram illustrating a format conversion apparatus according to another exemplary embodiment of the present invention. The format conversion apparatus of FIG. 5 generally includes a memory 510 and a converting module (not illustrated).

The memory 510 stores image data of a band interleave format. The converting module repeats an operation of reading, from the memory 510, a plurality of image data components, and storing the plurality of image data components in a predetermined register, and converts the plurality of image data components into image data of a plurality of band separate formats. The converting module includes a memory controller 520 and a register file 530.

The memory controller 520 includes an AGU 550 and a SIMD packer 560.

The AGU 550 generates a read address at a read address line 527 reading the plurality of image data components from the memory 510, and applies the read address at the read address line 527 to the memory 510. In the present exemplary embodiment, the plurality of image data components is read by applying of the read address line 527 once in order to reduce access times to the memory 510. For example, when one image data component corresponds to 16-bits with reference to FIG. 1, an address "0" is applied, and R0, G0, B1, and R1 corresponding to total of 64-bits are read. In this case, an input at a stride line 523 corresponds to 64. Accordingly, G1, B1, R2, and G2 corresponding to a total of 64-bit are subsequently read again. When supposing to read eight image data components once, the input at the stride line 523 should be controlled to be 128.

The AGU 550 includes a latch which receives a base address at a base line 521, and stores the input address at the base line 521. Also, the AGU 550 outputs a value of adding the address at the base line 521, which is stored in the latch, and the input at the stride line 523 to the read address line 527 of the memory 510, and stores the added value in the latch. A structure and an operation of the AGU 550 are described above in detail with reference to FIG. 4.

A register file 530 includes a plurality of registers storing data at the plurality of image data components read from the memory 510 by the applying of the read address 527.

The SIMD packer 560 enables a plurality of registers in a location predetermined depending on a type of the image data component from within the register file 530, and stores the plurality of image data components in the plurality of registers 531 through 539 and 541 through 543.

A controller (not illustrated) performs a calculation by simultaneously inputting the data stored in the plurality of registers of the register file 530 into an N-partitioned ALU 540. For example, the ALU 540 corresponds to an ALU which performs a 64-bit calculation, and when a 16-bit calculation is performed, one clock cycle should be consumed. When performing the calculation by simultaneously inputting the four 16-bit data into the ALU 540, fourfold throughput is provided. In FIG. 5, the 64-bit ALU 540 is used as a four-partitioned ALU, and performs the calculation by receiving four 16-bit register values as an input. This is described in detail with reference to FIG. 7 as follows.

FIG. 6A through 6D are diagrams illustrating operations of a format conversion apparatus of FIG. 5.

The memory 510 of FIG. 5 stores image data of a band interleave format. The present exemplary embodiment describes a case where the memory 510 stores data of FIG. 1.

A starting address in which the image data is stored is input from the memory 510 to the base line 521 in order to read a plurality of image data components. In the present exemplary embodiment, it is supposed that the starting address of the stored image data of FIG. 1 corresponds to "0". Accordingly, "0" is input into the base 521. Also, when it is intended to read four image data components by applying an address to the address line 527 once, and one image data component corresponds to 16-bits, 64 is input into the stride line 523. Accordingly, the AGU 550 generates an address "0", and applies the address "0" to the read address line 527 of the memory 510. Accordingly, 64-bit of the plurality of image data components R0, G0, B1, and R1 read from the memory 510 are output to a data output line 511 of the memory 510.

The data output line 511 of the memory 510 is divided into lines 513, 515, 517, and 519 of 16-bits each, and wiring with different register sets is performed in the data output line 511 of the memory 510. In FIG. 5, the line 513 is connected with registers 531, 535, and 539, and the line 515 is connected with registers 532, 536, and 541. The line 517 is connected with registers 533, 537, and 542, and the line 519 is connected with registers 534, 538, and 543.

Also, the SIMD packer 560 enables a plurality of registers in a location predetermined depending on a type of the image data component from among registers included in the register file 530. The SIMD packer 560 enables the plurality of registers in the predetermined location via WE lines 525, 526, 527, and 528 connected with the registers of the register file 530.

Figure 6A:
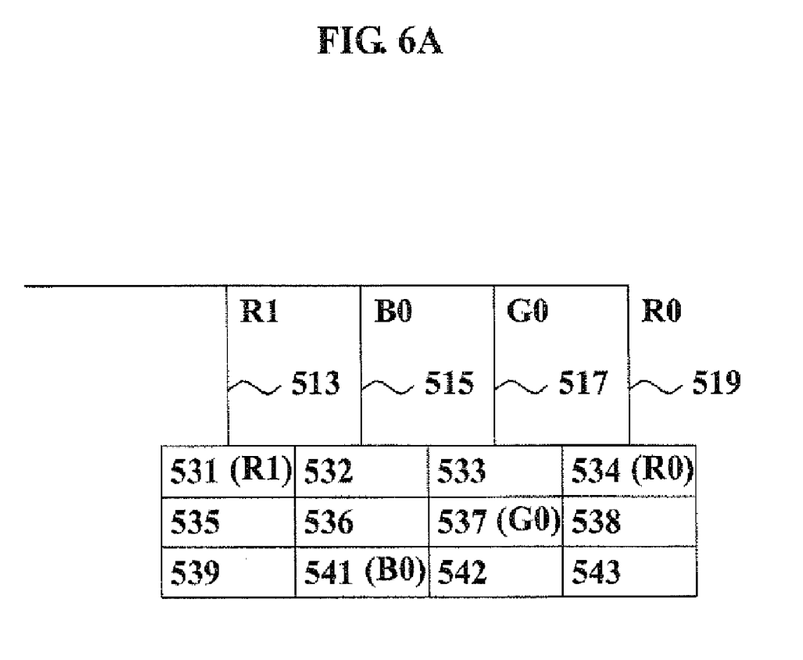
FIG. 6A through 6D are diagrams illustrating operations of a format conversion apparatus of FIG. 5.

Referring to FIG. 6A, the SIMD packer 560 enables the registers 531, 534, 537, and 541. Accordingly, the data transmitted via the lines 513, 515, 517, and 519 are respectively stored in the registers 531, 534, 537, and 541. When the read data correspond to R0, G0, B1, and R1, an image data component R1 is stored in the register 531 via the line 513. Similarly, an image data component B0 is stored in the register 541 via the line 515, an image data component G0 is stored in the register 537 via the line 517, and an image data component R0 is stored in the register 534 via the line 519.

Since 64 is input into the stride line 523, the AGU 550 subsequently generates an address "64", and applies the address "64" to the memory 510. Referring to FIG. 1, data G1, B1, R2, and G2 are read. The SIMD packer 560 enables the registers 538, 542, 532, and 535, Accordingly, the data G1, B1, R2, and G2 are respectively stored in the registers 538, 542, 532, and 535 as illustrated in FIG. 6B.

Next, the AGU 550 generates an address "128", and applies the address "128" to the memory 510. Referring to FIG. 1, data B2, R3, G3, and B3 are read. The SIMD packer 560 enables registers 543, 533, 536, and 539. Accordingly, the data B2, R3, G3, and B3 are respectively stored in the registers 543, 533, 536, and 539 as illustrated in FIG. 6C.

Figure 6B:
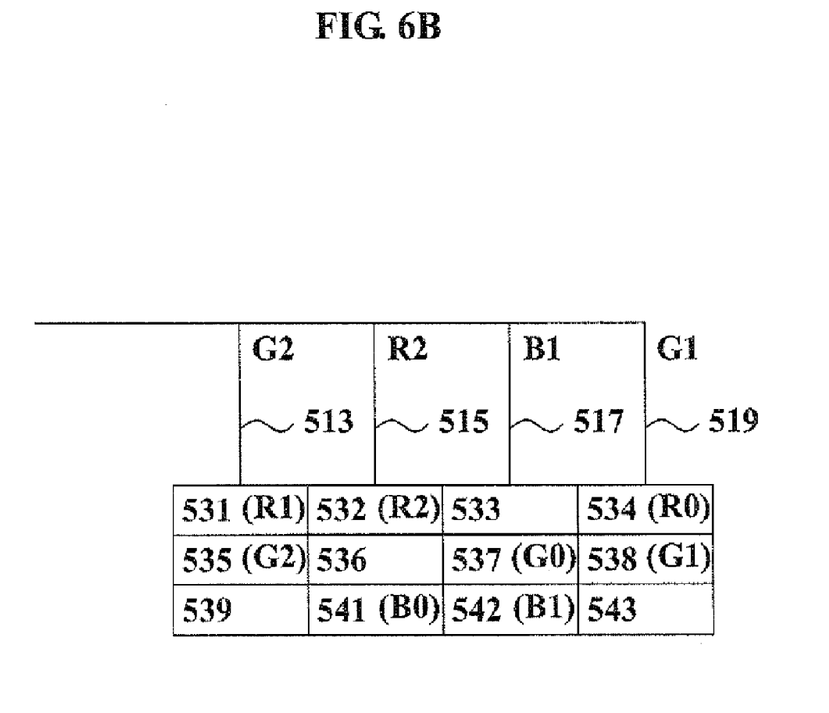
Figure 6C:
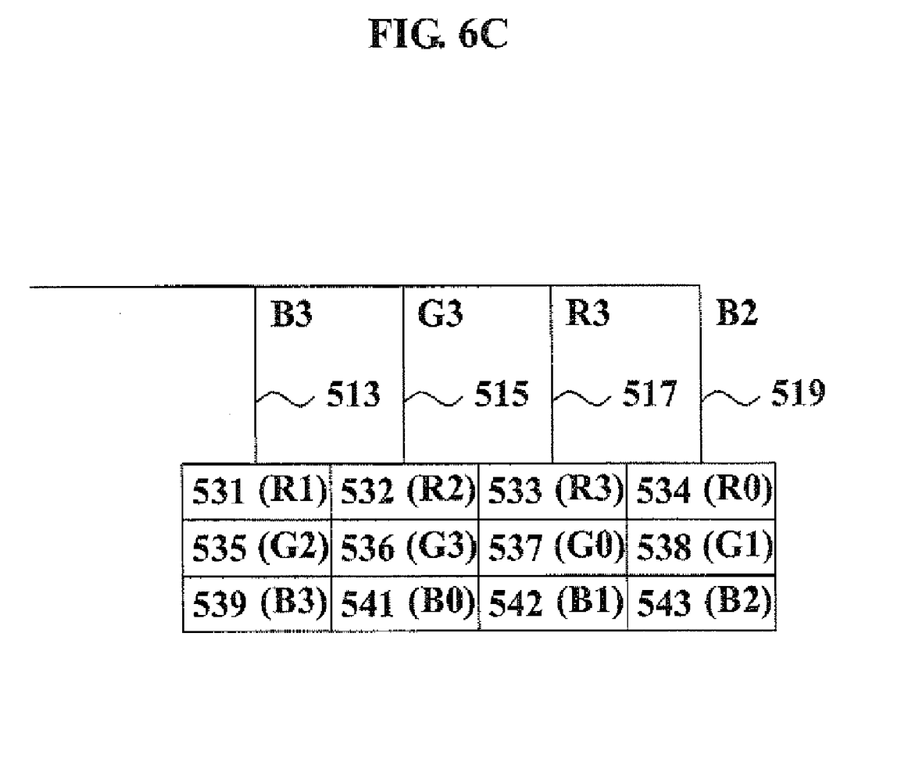
Figure 6D:
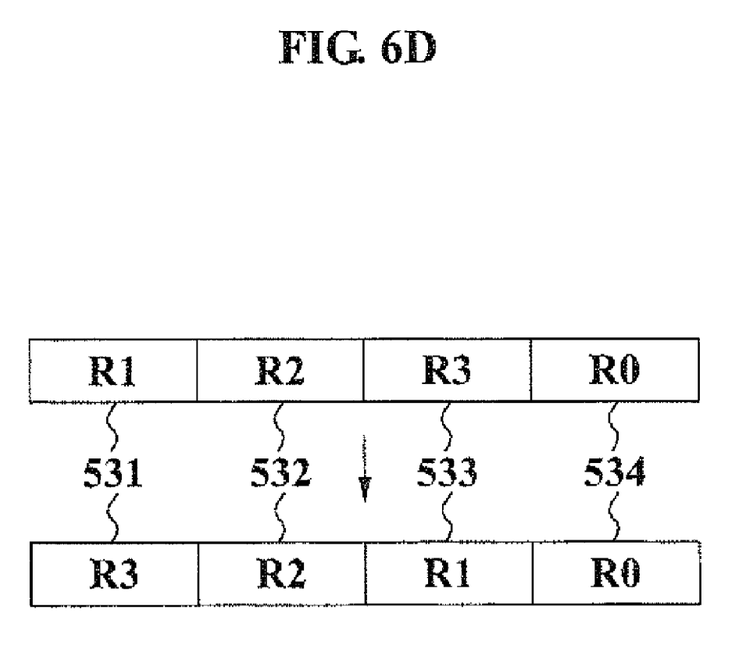

The SIMD packer 560 may convert the image data stored in the band interleave format into the band separate format by repeating register selection as illustrated in FIGS. 6A through 6C. As illustrated in FIG. 6C, image data components of an identical type are collected, however, sequence control is required. The sequence control may be easily performed using permutation. When the permutation operation is performed, the image data of the identical type may be sequentially lined up. Since general SIMD controllers support the permute operation, the data of the band separate format may be easily acquired when image data are categorized for each image data of the identical type using FIGS. 6A through 6C.

Figure 7:
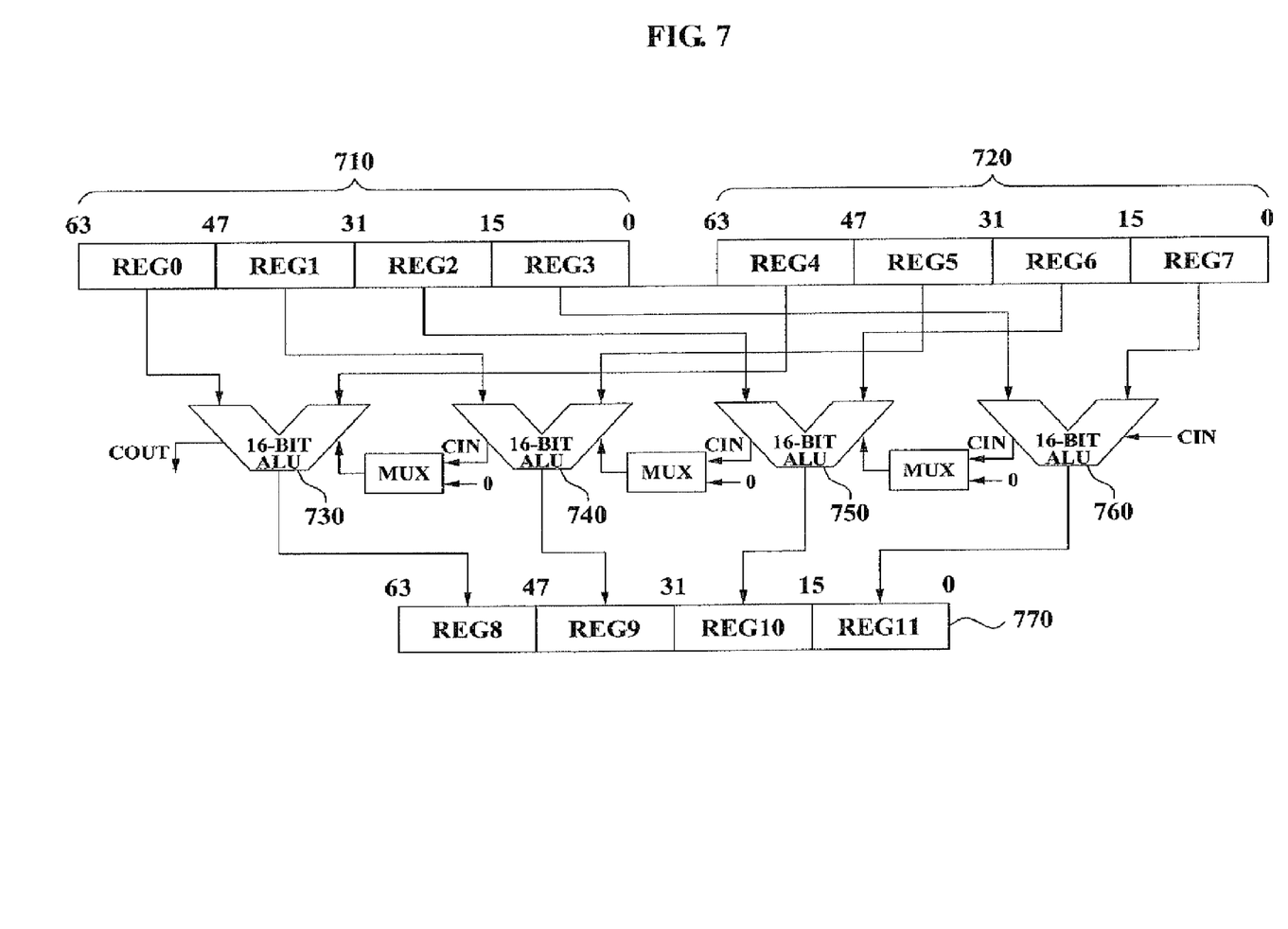
FIG. 7 is a diagram illustrating a configuration of separating and using a 64-bit ALU into four 16-bit ALUs according to an exemplary embodiment of the present invention.

FIG. 7 is a diagram illustrating a configuration of partitioning and using a 64-bit ALU into four 16-bit ALUs according to an exemplary embodiment of the present invention.

Recently, since performance of an ALU has been significantly improved, a 64-bit ALU is generally used. However, as described above, when one image data component has a 16-bit value, the 64-bit ALU performs a calculation of two 16-bit image data components in one clock cycle, a remaining 32-bits are wasted. Accordingly, an exemplary embodiment of the present invention improves throughput since an N-partitioned ALU simultaneously performs a plurality of calculations when a calculation of image data converted into a band separate format is performed.

In FIG. 3 and FIG. 5, the image data converted into the band separate format is stored in the register files 330 and 530, respectively. Registers 710 and 720 of FIG. 7 are included in the register files 330 and 530. 16-bit ALUs 730, 740, 750, and 760 are physically one 64-bit ALU, however, the calculation is performed for 16-bits. Specifically, the 16-bit ALU 730 receives Reg0 and Reg4 as an input, performs the calculation, and outputs a result of the calculation to Reg8. The 16-bit ALU 740 receives Reg1 and Reg5 as an input, performs the calculation, and outputs a result of the calculation to Reg9. The 16-bit ALU 750 receives Reg2 and Reg6 as an input, performs the calculation, and outputs a result of the calculation to Reg10. The 16-bit ALU 760 receives Reg3 and Reg7 as an input, performs the calculation, and outputs a result of the calculation to Reg11. An operation of the 16-bit ALUs 730, 740, 750, and 760 is simultaneously performed in one clock cycle. The output data 770 is stored in the band separate format.

The exemplary embodiments of the present invention include computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

For example, an entirety and a portion of the memory controllers 320 and 520 described in an exemplary embodiment of the present invention may be realized in a computer program. In this case, the medium including the computer program is included in the exemplary embodiment of the present invention.

As described above, according to an exemplary embodiment of the present invention, there is provided a format conversion apparatus and method which can efficiently convert image data of a band interleave format into image data of a band separate format.

Also, according to an exemplary embodiment of the present invention, there is provided a format conversion apparatus and method which can convert image data of a band interleave format into image data of a band separate format, subsequently partition an ALU into N-partitions, and process the image data of the band separate format by a SIMD method, thereby improving efficiency of an image process.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A format conversion apparatus, the apparatus comprising:
    a memory which stores image data of a band interleave format; and
    a converting module which reads the memory by increasing a read address of the memory by a stride for classifying color bands, and converts the image data of the band interleave format into image data of a band separate format.

2. The apparatus of claim 1, wherein the image data of the band interleave format, which is read by increasing the read address of the memory by the stride, corresponds to an image data component of an identical type.

3. The apparatus of claim 1, wherein the converting module comprises:
    a memory controller which generates a base address and successively generates N-number of addresses by increasing the base address N-1 times by the stride.

4. The apparatus of claim 3, wherein the memory controller comprises:
    a latch which receives and stores the base address.

5. The apparatus of claim 4, wherein the memory controller, for each clock cycle, outputs a value of adding the base address, which is stored in the latch, and the stride to an address line of the memory, and stores the added value in the latch.

6. The apparatus of claim 1, wherein the converting module further comprises:
    a register file comprising N-number of registers, which store register data read from the memory N-times, wherein the stored register data corresponds to the image data of the band separate format.

7. The apparatus of claim 6, further comprising:
    a controller which performs a calculation by simultaneously inputting the stored register data into an N-partitioned arithmetic logic unit (ALU).

8. The apparatus of claim 1, wherein the stride equals a number of different component types of the image data multiplied by a number of bits allocated to each component type for a pixel of the image data.

9. A format conversion apparatus, the apparatus comprising:
    a memory which stores image data of a band interleave format; and
    a memory controller which, for each clock cycle, increases a read address of the memory from a base address by a stride for classifying color bands, and applies the read address to the memory.

10. The apparatus of claim 9, wherein N-number of image data, which is successively read by the applying of the read address, corresponds to an image data component of an identical type.

11. The apparatus of claim 10, further comprising:
a register file comprising an N-number of registers, which store register data of the N-number of image data successively read by the applying of the read address.

12. The apparatus of claim 11, wherein the stored register data corresponds to a band separate format.

13. The apparatus of claim 11, further comprising:
a controller which performs a calculation by simultaneously inputting the stored register data into an N-partitioned arithmetic logic unit (ALU).

14. The apparatus of claim 9, wherein the stride equals a number of different component types of the image data multiplied by a number of bits allocated to each component type for a pixel of the image data.

15. A format conversion apparatus, the apparatus comprising:
a memory which stores image data of a band interleave format;
a converting module which repeats an operation of reading a plurality of image data components from the memory, and storing the plurality of image data components in a predetermined register, and which converts the plurality of image data components into image data of a plurality of band separate formats;
wherein for each operation of reading the plurality of image data components from the memory, an address from which the plurality of image data components are read is incremented by a stride for classifying color bands.

16. The apparatus of claim 15, wherein the converting module comprises:
an address generation unit (AGU) which generates a read address reading the plurality of image data components from the memory, and applies the read address to the memory; and
a register file comprising a plurality of registers which stores the plurality of image data components read by the applying of the read address.

17. The apparatus of claim 16, wherein the converting module further comprises:
a single instruction multiple data (SIMD) packer which enables a plurality of registers in a location predetermined depending on a type of the image data component from the register file, and stores the plurality of image data components in the plurality of registers.

18. The apparatus of claim 17, further comprising:
a controller which performs a calculation by simultaneously inputting the plurality of image data components stored in the plurality of registers into an N-partitioned arithmetic logic unit (ALU).

19. The apparatus of claim 15, wherein the AGU further comprises:
a latch which receives a base address, and stores the base address, wherein a value of adding the base address, which is stored in the latch, to the stride is output to an address line of the memory, and the added value is stored in the latch.

20. The apparatus of claim 15, wherein the stride equals a number of different component types of the image data multiplied by a number of bits allocated to each component type for a pixel of the image data.

* * * * *